United States Patent
Miyatake et al.

(10) Patent No.: US 9,279,521 B2
(45) Date of Patent: Mar. 8, 2016

(54) WIRE MANAGEMENT CLIP FOR STRUCTURES SUCH AS SOLAR RACKING SYSTEMS

(71) Applicants: Jaquelyn Miyatake, San Anselmo, CA (US); Miguel M. L. Praca, Kentfield, CA (US)

(72) Inventors: Jaquelyn Miyatake, San Anselmo, CA (US); Miguel M. L. Praca, Kentfield, CA (US)

(73) Assignee: SunLink Corporation, San Rafael, CA (US)

( * ) Notice: Subject to any disclaimer, the term of this patent is extended or adjusted under 35 U.S.C. 154(b) by 0 days.

(21) Appl. No.: 14/208,607

(22) Filed: Mar. 13, 2014

(65) Prior Publication Data
US 2014/0263875 A1  Sep. 18, 2014

Related U.S. Application Data

(60) Provisional application No. 61/779,920, filed on Mar. 13, 2013.

(51) Int. Cl.
*F16L 3/08*  (2006.01)
*F16L 3/24*  (2006.01)

(52) U.S. Cl.
CPC ............ *F16L 3/24* (2013.01); *Y10T 24/1498* (2015.01)

(58) Field of Classification Search
CPC .................................................. Y10T 24/1461
USPC .......................................................... 248/74.2
See application file for complete search history.

(56) References Cited

U.S. PATENT DOCUMENTS

| | | | | |
|---|---|---|---|---|
| 2,981,513 | A * | 4/1961 | Brown | 248/73 |
| 4,479,625 | A * | 10/1984 | Martz | 248/74.1 |
| 6,189,187 | B1 * | 2/2001 | Williams | 24/563 |
| 6,783,104 | B1 * | 8/2004 | Roth | 248/230.1 |
| D691,463 | S * | 10/2013 | Sendra-Gonzalez et al. | D8/394 |
| 2010/0299891 | A1 * | 12/2010 | Myers | 24/457 |
| 2011/0278407 | A1 * | 11/2011 | Osiecki et al. | 248/206.5 |
| 2012/0012716 | A1 * | 1/2012 | Lien | 248/74.2 |

* cited by examiner

*Primary Examiner* — Joanne Silbermann
(74) *Attorney, Agent, or Firm* — Reed Smith LLP

(57) ABSTRACT

A wire management clip formed of an elastic material to clip onto a structural element. The clip is formed to include an area for supporting a wire or wire bundle. Preferably, the clip includes holes formed on opposing sides to allow a strap attachment, such as a zip-tie, to hold a conduit or wire outside the clip.

4 Claims, 6 Drawing Sheets

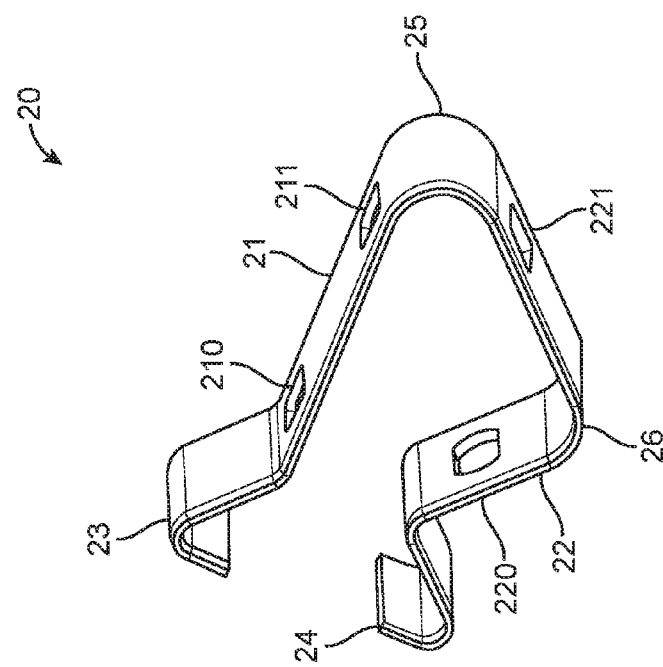
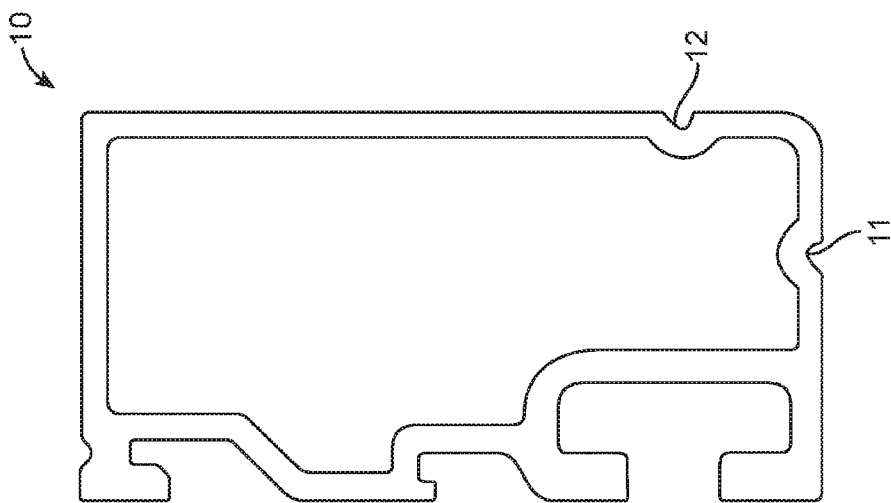

WIRE MANAGEMENT CLIP FOR STRUCTURES SUCH AS SOLAR RACKING SYSTEMS

This application claims the benefit of U.S. Provisional Application No. 61/779,920, filed Mar. 13, 2013, entitled WIRE MANAGEMENT CLIP FOR STRUCTURES SUCH AS SOLAR RACKING SYSTEMS, the disclosure of which is herein incorporated by reference.

BACKGROUND OF THE INVENTION

1. Field of the Invention

The present invention relates generally to photovoltaic mounting systems, and more particularly, to a wire management clip.

2. Description of the Related Art

There are various solutions in the market for addressing the need to neatly manage an electrical wire harness along structural elements in systems such as solar racking structures. For example, in solar racking systems the electrical wires from each photovoltaic panel need to be safely and easily routed along the racking structure.

The most common device used is the zip-tie which can tie a single wire or a bundle to any point where there is a hole, or other structure, to attach the tie. There are many variations of the zip-tie with integrated features to fasten into holes, slots, flanges, etc. Other solutions available include metal or plastic wire clips that are generally fastened by snapping into place via a spring action or by using a threaded fastener.

Generally, these prior solutions require a hole or other mechanical feature in order to attach the fastener. When the structural element is an extrusion or a roll form shape, the requirement to place holes for attaching wire management clips or ties adds cost, and restricts the location where the wire management components can attach. Another common feature in extrusions or roll forms that can be used to attach a clip is a flange. Most clips require high insertion force to attach to a flange and to insert the wire, which is hard on the installer's fingers, especially when an installer is required to install a large number of fasteners in a short time. However, a continuous flange provides a lot of freedom for placing the clip anywhere along the structural member.

SUMMARY OF THE INVENTION

A wire management clip according to the present invention may snap onto two edges of a structural element with spring action. The preferred embodiment is a strip of spring material with two opposing edges that can be moved apart by spring action, and a middle loop of material that can accommodate one or more wires.

According to one embodiment of the present invention, a wire retention clip comprises an elastic strip formed with an angle to create two opposing sides, each opposing side comprising a flat edge on an end opposite the angle, and each flat edge configured to engage a slot or groove in a structural element. The clip may further comprise a second angle bend in the elastic strip to form a loop in the clip to hold a wire or wire bundle. In addition, the clip may have two holes formed in each opposing side, such that a strap attachment, for example a zip-tie, can be placed through the clip. The strap attachment can secure the wire inside the loop or may secure a conduit or wire to the outside of the clip.

The wire retention clip can be used on extruded shapes that engage two opposing flat edges on extruded features such as grooves or flanges. The clip may be made from a strip of elastic material shaped as a hoop, with opposing sides, that provides a snap feature elasticity. The hoop shape can be used either to surround the wire that is to be retained, or as a support for a wire bundle or conduit that is outside the hoop and attached to it by means of an attachment such as a zip-tie. The clip may be formed with holes to thread an attachment, strapping device, or tie, where the use of a strapping device, attachment or tie that holds a wire bundle or conduit provides additional retention strength by tightening the grip of the clip on to the structural element.

BRIEF DESCRIPTION OF THE DRAWINGS

The present invention will be readily understood by the following detailed description in conjunction with the accompanying drawings, wherein like reference numerals designate like structural elements, and in which:

FIG. 1 illustrates a cross-sectional view of an extruded structural element for use with the present invention;

FIG. 2 illustrates an embodiment of the present wire management clip;

DETAILED DESCRIPTION OF THE INVENTION

Figure 3A:
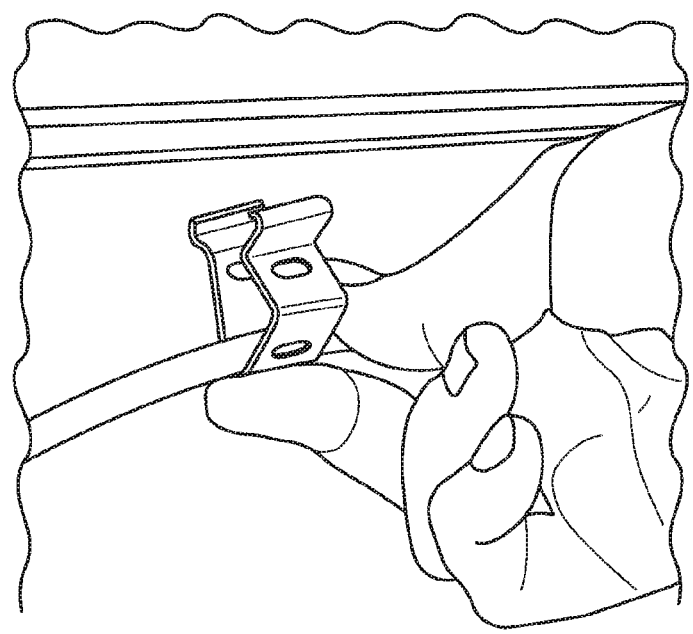
FIGS. 3A-3C illustrate the attachment of a wire management clip to a structural element, wherein the wire is held in the clip, according to one embodiment of the present invention.

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

In general, a wire management clip according to the present invention can attach anywhere along a structural member, and requires only two small slots or a two edged flange along the structural member. An extruded member can have those features designed into it with little impact to the part cost. A roll form can also have such features added at little cost. These continuous features allow the clip to attach at any point along the structural element.

A wire management clip according to the present invention may snap onto two edges of a structural element with spring action. The preferred embodiment is a strip of spring material with two opposing edges that can be moved apart by spring action, and a middle loop of material that can accommodate one or more wires.

In further detail, as shown in FIG. 1, an extruded structural support element 10 may include clip grooves 11, 12 along one edge to facilitate the fastening of a wire management clip according to the present invention.

One example of a wire management clip 20 according to the present invention is illustrated in FIG. 2. The clip 20 is preferably comprises a metal strip formed into a shape to attach to a structural element. More particularly, the clip 20 generally includes two opposing sides 21, 22 having an angled corner 25 ("bend"), which provides a "snap" feature elasticity. This allows the clip 20 to expand sufficiently to attach to a structural element, while also providing sufficient holding tension. The clip 20 further includes opposed flat edges 23, 24 to grasp into, for example, the clip grooves 11, 12 of the structural element 10. In a preferred embodiment the clip 20 further includes a second angled section 26 (second bend). This second angle section 26 provides for space forming a "loop" in the clip 20 to hold a wire or wire bundle. In addition, the clip 20 also preferably includes four holes 210, 211, 220, 221—two holes on each opposing side 21, 22. A "zip-tie" or any other similar strap attachment device can be inserted through the holes to attach a wire, wire bundle or conduit to the clip 20, as described below. Zip-tie type attachments are well known in the art.

Note that the clip 20 illustrated in FIG. 1 is merely one example of an implementation of the present invention, and the exact mechanical configuration may be altered to suit the specific structural design of a structural element. In addition, the clip may be formed from any strip of elastic material that provides a "spring action."

Figure 3B:
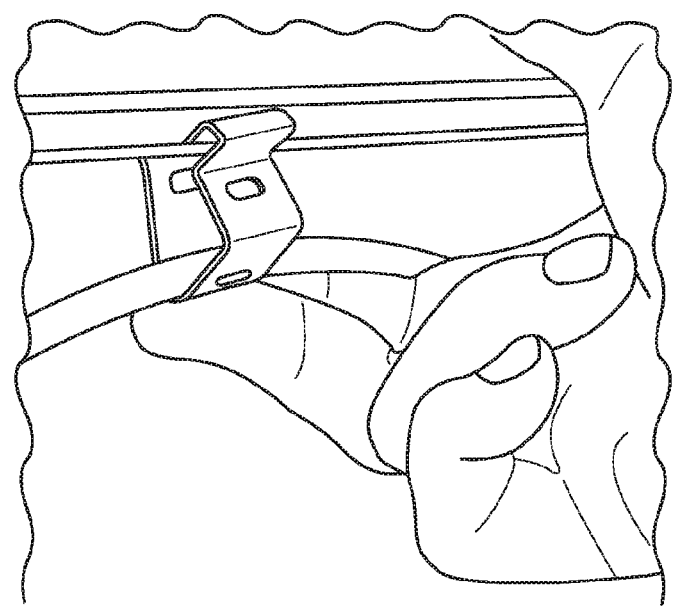
Figure 3C:
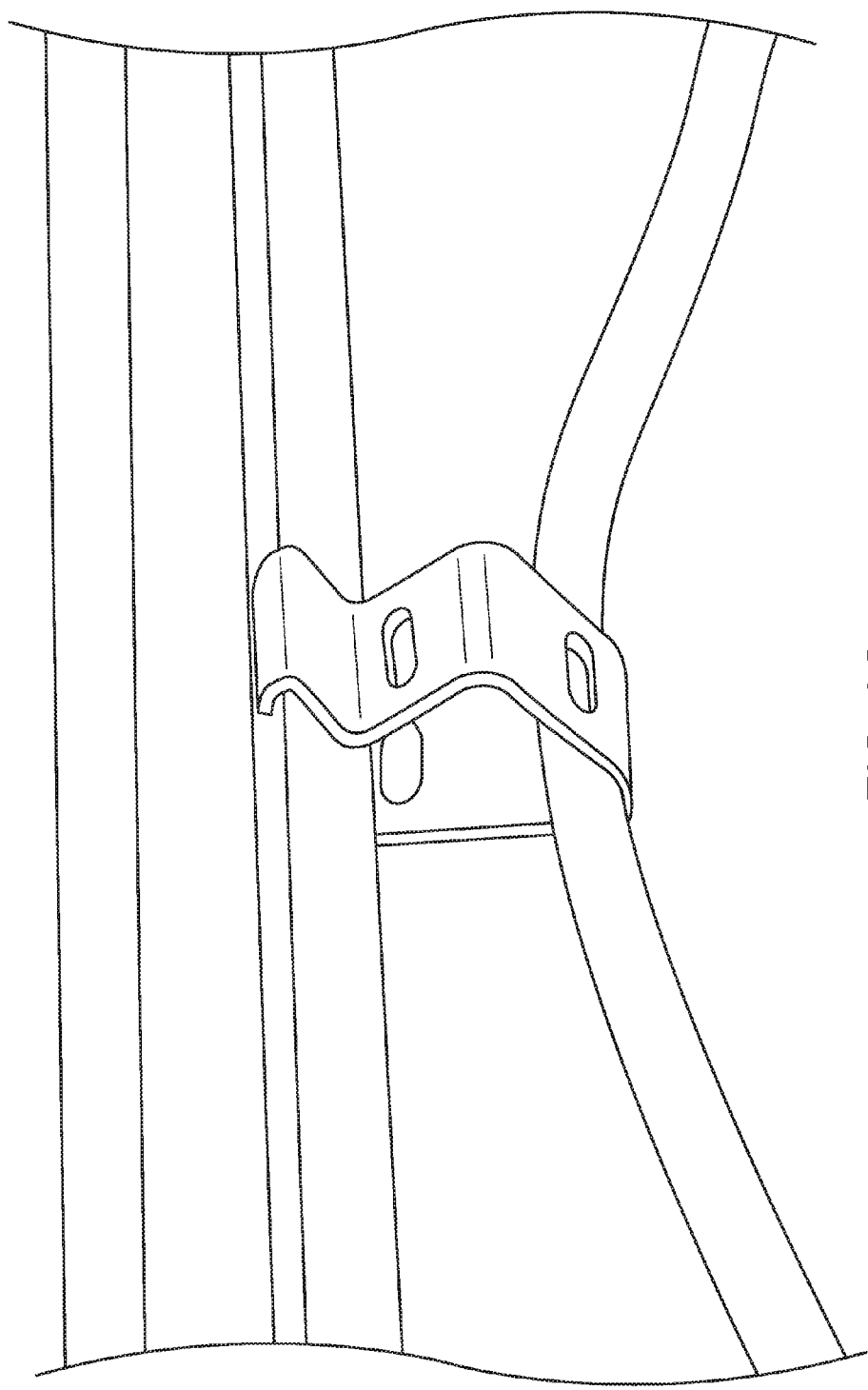

FIGS. 3A-3C illustrate the attachment of the wire management clip 20 to a structural element. As shown in FIG. 3A, an installer places a wire or wire bundle in the "loop" section of the clip 20. The installer then snaps the clip into corresponding grooves on the structural element as shown in FIG. 3B. In this configuration, a zip-tie is not necessary, since the wire management clip 20 itself is holding the wire.

As illustrated in FIG. 2, the wire management clip 20 has a shape that can cradle a conduit or a wire bundle, when they are held in place by a zip-tie that is attached to the clip 20 through the holes 210, 211, 220, 221 designed for that purpose. The clip 20 is designed to accommodate the zip tie, or similar strapping device, in such a configuration that by tightening the strap forces the clip to grip harder onto the structure.

Figure 4A:
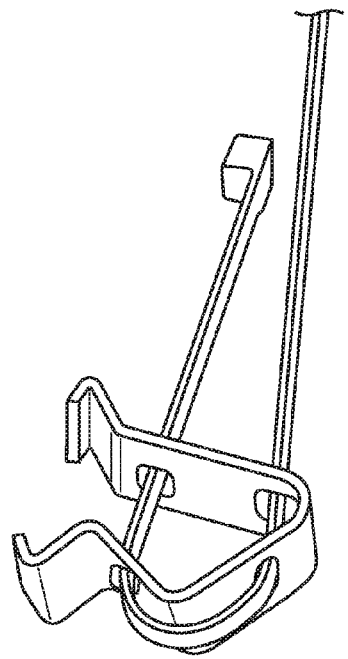
FIG. 4A illustrates the placement of a zip-tie on a wire management clip according to one embodiment of the present invention.
Figure 4B:
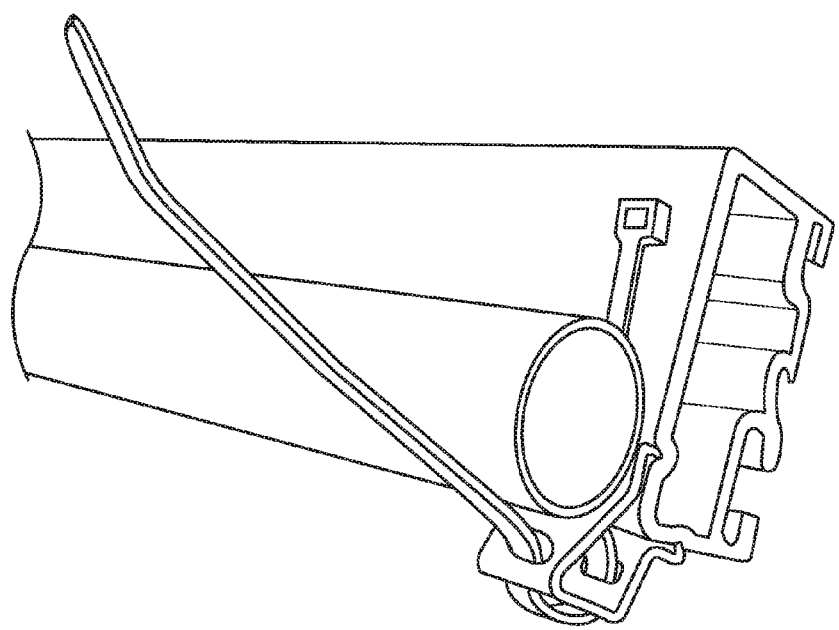
FIG. 4B illustrates attaching a metal conduit to a racking structure using the wire management clip of FIG. 4A, according to an embodiment of the present invention.
Figure 4C:
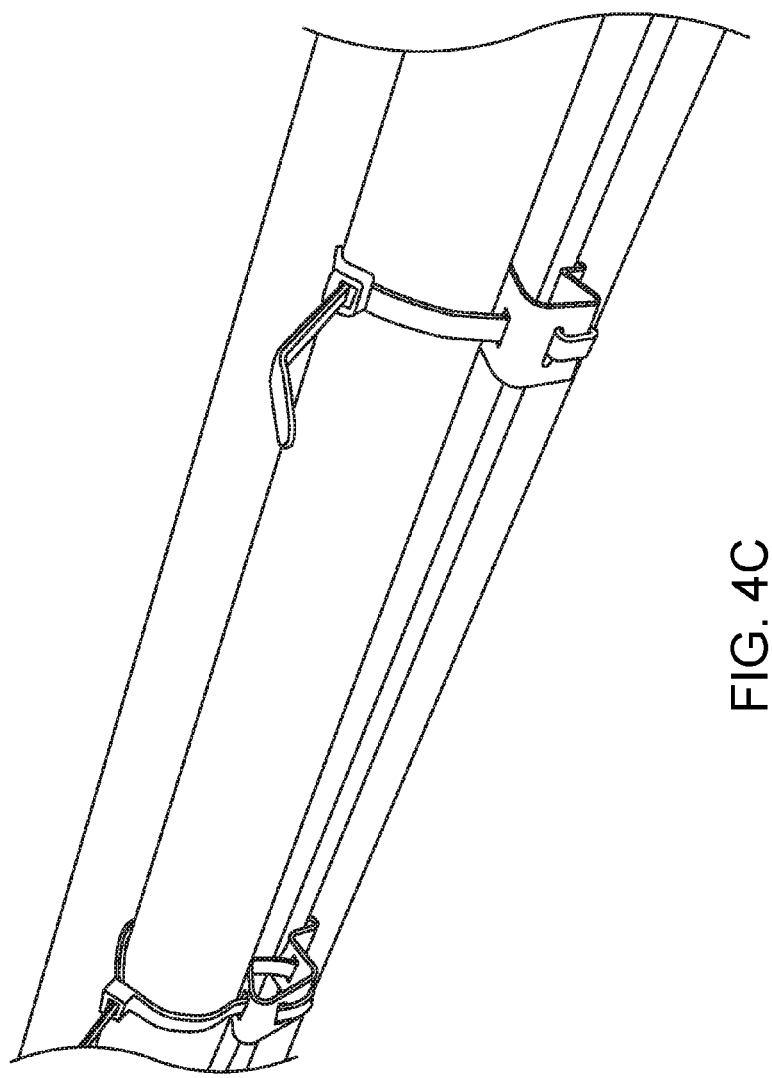
FIG. 4C illustrates the finished attachment of the clip and conduit of FIG. 4B, according to an embodiment of the present invention.

FIGS. 4A-4C illustrate the use of the present wire management clip 20 to hold a wire conduit in place against a structural element. In FIG. 4A, an zip-tie is inserted through the four attachment holes (as discussed above). Next, FIG. 4B illustrates the clip attached to the structural element and a wire conduit placed on top of the clip. FIG. 4C shows the zip-tie fastened around the conduit to attach the conduit to the structural element. Note that in the illustrations of FIGS. 4A-4C, a metal conduit is attached to the structural element, but the clip may be used in this configuration to attach a single wire or a wire bundle in a similar fashion.

Figure 5B:
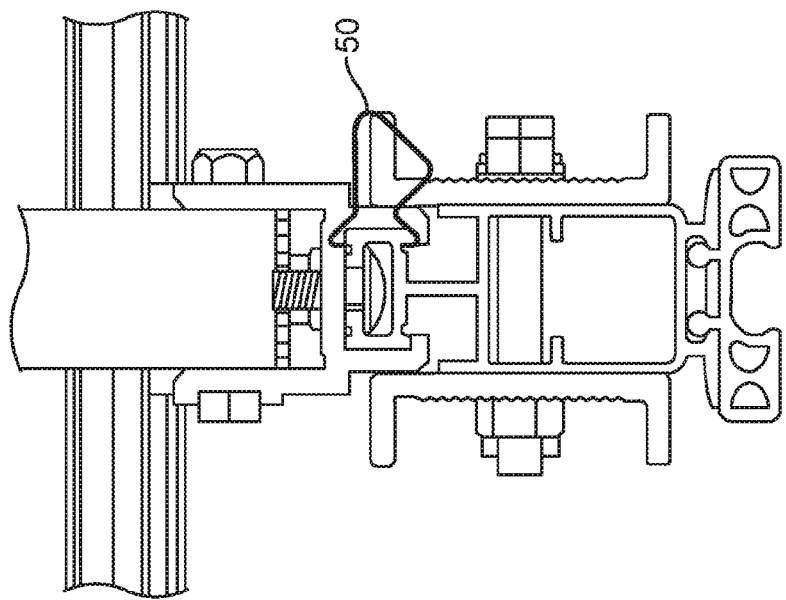
FIG. 5B is a cross-sectional view of the clip and structural element of FIG. 5A, according to an embodiment of the present invention.
Figure 5A:
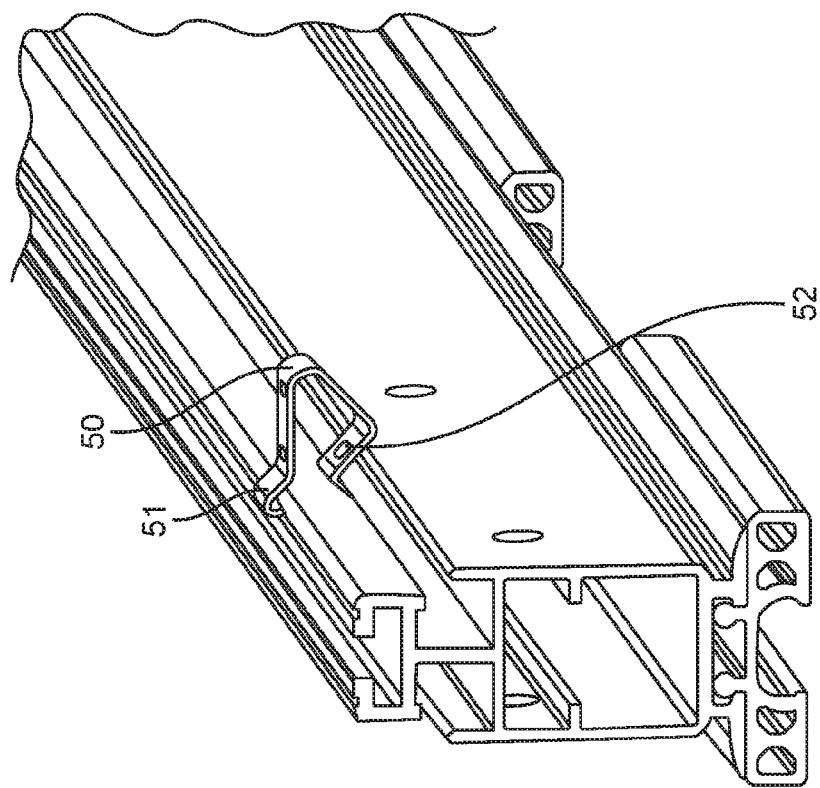
FIG. 5A is an isometric view of a wire management clip attached to a groove and flange of a structural element, according to an embodiment of the present invention.

FIGS. 5A and 5B illustrate that the present wire management clip may also be attached to a structural element having a deeper channel groove and a flange. FIG. 5A is an isometric view of this embodiment. In this embodiment, the clip 50 is formed such that the top edge 51 can interface with a channel and the bottom edge 52 can interface with a flange on the structural element. FIG. 5B illustrates a cross-sectional view of the clip and structural element of FIG. 5A.

As described and illustrated herein, the present wire management clip is easy to insert and easy to remove. For removal, the holes that are used to thread a zip-tie can be used to obtain leverage with a small screwdriver, which will pop it off effortlessly. Yet, when properly engaged in its locked position, its retention capacity against wires pulling lose is very high.

The wire retention clip can be used on extruded shapes that engage two opposing flat edges on extruded features such as grooves or flanges. The clip may be made from a strip of elastic material shaped as a hoop, with opposing sides, that provides a snap feature elasticity. The hoop shape can be used either to surround the wire that is to be retained, or as a support for a wire bundle or conduit that is outside the hoop and attached to it by means of an attachment such as a zip-tie. The clip may be formed with holes to thread an attachment, strapping device, or tie, where the use of a strapping device, attachment or tie that holds a wire bundle or conduit provides additional retention strength by tightening the grip of the clip on to the structural element.

Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. A wire retention clip comprising:
   an elastic strip formed with a first angle bend and a second angle bend, wherein the first angle bend forms the strip into two opposing sides, and the second angle bend creates a loop space for a wire or wire bundle;
   a flat edge on each end of the elastic strip formed facing the opposing side, each edge formed to interface with a groove on a structural element;
   two holes in each opposing side; and
   a strap attachment attached through the two holes on each opposing side.

2. The clip of claim 1, wherein the strap attachment is a zip tie.

3. A wire retention system comprising:
   a structural element comprising two grooves;
   an elastic strip formed with a first angle bend and a second angle bend, wherein the first angle bend forms the strip into two opposing sides, and the second angle bend creates a loop space for a wire or wire bundle;
   a flat edge on each end of the elastic strip formed facing the opposing side, each edge formed to interface with one of the groove on the structural element;
   two holes in each opposing side; and
   a strap attachment attached through the two holes on each opposing side;
   wherein the flat edges of the elastic strip attach to the structural element, and the strap attachment compresses the elastic strip against the structural element.

4. The wire retention system of claim 3, wherein the strap attachment holds a conduit or wire bundle to an external side of the elastic strip.

* * * * *